"""(12) United States Patent
Fürstenhöfer et al.

(10) Patent No.: US 11,761,527 B2
(45) Date of Patent: Sep. 19, 2023

(54) TRANSMISSION DEVICE FOR AN ELECTRICALLY DRIVEABLE VEHICLE, DRIVE DEVICE FOR AN ELECTRICALLY DRIVEABLE VEHICLE, AND VEHICLE

(71) Applicant: Valeo Siemens eAutomotive Germany GmbH, Erlangen (DE)

(72) Inventors: Christian Gerhard Fürstenhöfer, Fürth (DE); Bernd Haas, Nuremberg (DE)

( * ) Notice: Subject to any disclaimer, the term of this patent is extended or adjusted under 35 U.S.C. 154(b) by 0 days.

(21) Appl. No.: 17/780,103

(22) PCT Filed: Nov. 24, 2020

(86) PCT No.: PCT/EP2020/083124
§ 371 (c)(1),
(2) Date: May 26, 2022

(87) PCT Pub. No.: WO2021/105081
PCT Pub. Date: Jun. 3, 2021

(65) Prior Publication Data
US 2022/0412447 A1    Dec. 29, 2022

(30) Foreign Application Priority Data
Nov. 29, 2019   (DE) ............... 10 2019 132 496.3

(51) Int. Cl.
*F16H 57/02*   (2012.01)
*H02K 7/116*   (2006.01)
*F16H 63/34*   (2006.01)

(52) U.S. Cl.
CPC ......... *F16H 57/02* (2013.01); *F16H 63/3466* (2013.01); *H02K 7/1166* (2013.01);
(Continued)

(58) Field of Classification Search
CPC ................ F16H 57/02; F16H 63/3466; F16H 2057/02034; F16H 2057/02043; F16H 63/3416; H02K 7/1166; H02K 2205/09
See application file for complete search history.

(56) References Cited

U.S. PATENT DOCUMENTS 6,273,232 B1 *   8/2001   Kimura ............... F16H 63/3458
                                                    192/219.6
2019/0271394 A1 *   9/2019   Kramer ................. F16D 63/006
(Continued)

FOREIGN PATENT DOCUMENTS

DE   102015217875 A1   3/2017
EP       4023911 A1 *   7/2022   ............. F16H 63/34

OTHER PUBLICATIONS

Machine translation of EP 4023911 A1, Furstenhofer et al., Jul. 6, 2022 (Year: 2022).*
(Continued)

*Primary Examiner* — Vinh Luong
(74) *Attorney, Agent, or Firm* — Osha Bergman Watanabe & Burton LLP

(57) ABSTRACT

Described is a transmission device (1) for an electrically driveable vehicle having a transmission element (2), a parking lock (6), by which the transmission element (2) can be blocked and which has a parking lock actuator (8), and a transmission housing (9), which encloses the transmission element (2) and the parking lock (6). A pressure equalization apparatus (14) is connected to an exterior of the transmission housing (9) in a gas-permeable manner. The pressure equalization apparatus (14) has a lead-through element (16) which passes through a transmission housing opening (15) and a fluid guiding element (17), the first end of which is connected to the interior of the parking lock actuator (8) and the second end of which is connected to the lead-through element (16).

12 Claims, 5 Drawing Sheets

(52) U.S. Cl.
CPC ............. *F16H 2057/02034* (2013.01); *F16H 2057/02043* (2013.01)

(56) References Cited

U.S. PATENT DOCUMENTS

| | | | |
|---|---|---|---|
| 2021/0231213 A1* | 7/2021 | Miebach | F16H 63/3425 |
| 2021/0239210 A1* | 8/2021 | Miebach | B60T 1/062 |
| 2022/0154823 A1* | 5/2022 | Haas | F16H 63/3466 |
| 2022/0412458 A1* | 12/2022 | Paul | F16H 63/3458 |
| 2023/0001793 A1* | 1/2023 | Fürstenhöfer | B60R 16/0215 |

OTHER PUBLICATIONS

Translation of Written Opinion of the International Searching Authority of PCT/EP2020/083124, dated Feb. 16, 2021 (Year: 2021).*

* cited by examiner

TRANSMISSION DEVICE FOR AN ELECTRICALLY DRIVEABLE VEHICLE, DRIVE DEVICE FOR AN ELECTRICALLY DRIVEABLE VEHICLE, AND VEHICLE

BACKGROUND

The present invention relates to a transmission device for an electrically driveable vehicle, to a drive device for an electrically driveable vehicle, and to a vehicle.

The document DE 10 2015 217 875 A1 discloses a drive system with an electric machine and a transmission for a motor vehicle. The transmission has a transmission output shaft and a transmission housing, and also a parking lock.

SUMMARY

By integrating a parking lock in a transmission housing, construction space that is scarce, in particular with regard to the use of the transmission device in an electric drive device of a vehicle, can be saved. However, this poses special challenges due to the presence of lubricants and higher temperatures inside the transmission housing. In particular, a parking lock actuator of the parking lock can react sensitively to the lubricant, even to the extent of a functional failure.

The invention is based on the object of specifying a robustly operable option, which can be realized with little effort, for arranging a parking lock in a transmission housing.

This object is achieved according to the invention by a transmission device for an electrically driveable vehicle, comprising a transmission element, a parking lock, by means of which the transmission element can be blocked and which has a parking lock actuator, a transmission housing, which encloses the transmission element and the parking lock, a pressure equalization apparatus, by means of which an interior of the parking lock actuator is connected to an exterior of the transmission housing in a gas-permeable manner, wherein the pressure equalization apparatus has a lead-through element which passes through a transmission housing opening, and a fluid guiding element, the first end of which is connected to the interior of the parking lock actuator and the second end of which is connected to the lead-through element.

The invention is based on the finding that functional failures of the parking lock actuator can frequently be attributed to the penetration of lubricants into the parking lock actuator. This intrusion is due to a pressure difference between the interior of the parking lock actuator and the surroundings thereof. The pressure equalization apparatus provided in the transmission device according to the invention equalizes the pressure between the interior of the parking lock actuator and the exterior of the transmission housing, and thereby prevents penetration by the lubricant. This advantageously enables a more robust operation of the transmission device. Since the lead-through element is inserted directly into the transmission housing opening, the pressure equalization apparatus can be implemented with particularly little effort.

The fluid guiding element is preferably designed as a tube or hose. In an advantageous embodiment, the fluid guiding element is made of a plastic, for example PTFE or PPA.

In the case of the transmission device according to the invention, it is preferred if the pressure equalization device at the first end of the fluid guiding element has a coupling which is connected in a latching manner to a diametrically opposed coupling of the parking lock actuator, which coupling is preferably formed on a parking lock actuator housing. Alternatively or additionally, it can be provided that the pressure equalization apparatus at the second end of the fluid guiding element has a coupling which is connected in a latching manner to a diametrically opposed coupling of the lead-through element. The fluid guiding element can be arranged on the parking lock actuator or on the lead-through element with little effort and so as to be detachable and is also easy to maintain, since it can be easily replaced in the event of a defect in the fluid guiding element or the coupling on the fluid guiding element side.

It can advantageously be provided that the coupling at the first end of the fluid guiding element is designed as a cup coupling and/or the coupling at the second end of the fluid guiding element is designed as a cup coupling.

It is also expedient if the coupling of the parking lock actuator and/or the coupling of the lead-through element has or have a latching collar.

In an advantageous embodiment of the transmission device according to the invention, it can also be provided that the lead-through element has a membrane outside the transmission housing.

In order to prevent an undesirable ingress of dirt and the like into the pressure equalization apparatus, the transmission device according to the invention can provide for the lead-through element to have a gas-permeable protective cap at its free end outside the transmission housing.

In the case of the transmission device according to the invention, it is also preferred if the lead-through element has at least one sealing means which seals the lead-through element in relation to the transmission housing opening. In this way, it is also possible to prevent the lubricant from escaping through the through-opening. According to a development, it can be provided that the sealing means comprises one or more sealing rings. The sealing ring or a respective sealing ring can surround the lead-through element in the circumferential direction.

An arrangement of the lead-through element with particularly little effort is realized if the lead-through element is fastened in the transmission housing opening by means of a press fit. Alternatively, the lead-through element can be screwed into the transmission housing opening. According to yet another alternative, it can be provided that the lead-through element is passed through a common transmission housing opening with a plug connector. In this case, the lead-through element can, for example, pass through a plug connector housing, in particular a flange portion of the plug connector housing.

The object on which the invention is based is also achieved by a drive device for an electrically driveable vehicle, comprising an electric machine, a transmission device according to the invention, and a shaft which transmits a rotational motion of the electric machine to the transmission device.

It can be provided that the transmission housing is part of a housing enclosing the electric machine, the transmission device, and the shaft.

Finally, the object on which the invention is based is also achieved by a vehicle, comprising a drive device according to the invention which is configured to drive the vehicle.

BRIEF DESCRIPTION OF DRAWINGS

Further advantages and details of the present invention emerge from the exemplary embodiments described below and on the basis of the drawings. These are schematic illustrations in which.

DETAILED DESCRIPTION

Figure 1:
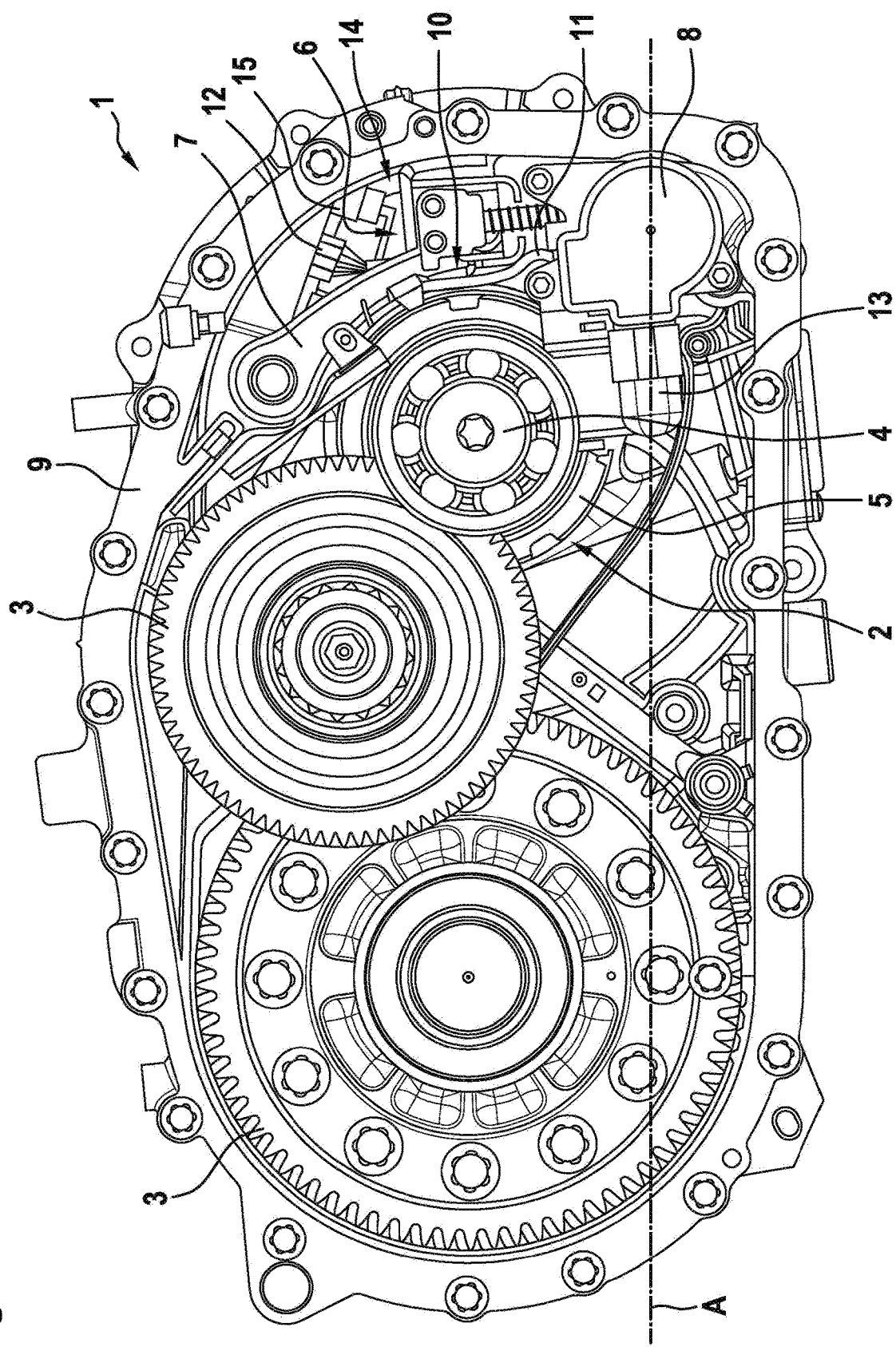
FIG. 1 shows a front view of an exemplary embodiment of the transmission device according to the invention in an open state.

FIG. 1 is a front view of an exemplary embodiment of a transmission device 1 in an open state.

The transmission device 1 comprises a transmission element 2 which is coupled to further transmission elements 3 in order to convert a rotational motion provided by a shaft 4, which is connected to the transmission element 2 for rotation therewith. Also fastened to the transmission element 2 is a parking lock wheel 5 of a parking lock 6, by means of which the transmission element 2 can be blocked. For this purpose, the parking lock 6 also has a parking lock pawl 7 which can be brought into engagement with the parking lock wheel 5 by means of a parking lock actuator 8 of the parking lock 6.

The transmission elements 2, 3 and the parking lock 6 are enclosed by a transmission housing 9. In order to lubricate the transmission elements 2, 3, the transmission device 1 has a lubricant bath, the operationally conventional filling level of which is indicated by a chain-dotted line A in FIG. 1. As can be seen, the parking lock 6 is partially located in the lubricant bath.

For the sake of completeness, FIG. 1 also shows a connection apparatus 10 which comprises a cable arrangement 11 running inside the transmission housing 9, a first plug connector 12 and a second plug connector 13. The plug connectors 12, 13 are attached to opposite ends of the cable arrangement 11, wherein the second plug connector 13 is connected to the parking lock actuator 8. The parking lock actuator 8 can be electrically supplied and activated from the outside by means of the connection apparatus 10.

The transmission device 1 comprises a pressure equalization apparatus 14—mostly concealed in FIG. 1 by the parking lock 6 and the connection apparatus 10—by means of which an interior of the parking lock actuator 8 is connected to an exterior of the transmission housing 9 in a gas-permeable manner and which is passed through a transmission housing opening 15. This transmission housing opening 15 and a further transmission housing opening for the passage of the first plug connector 12 are formed separately.

Figure 2:
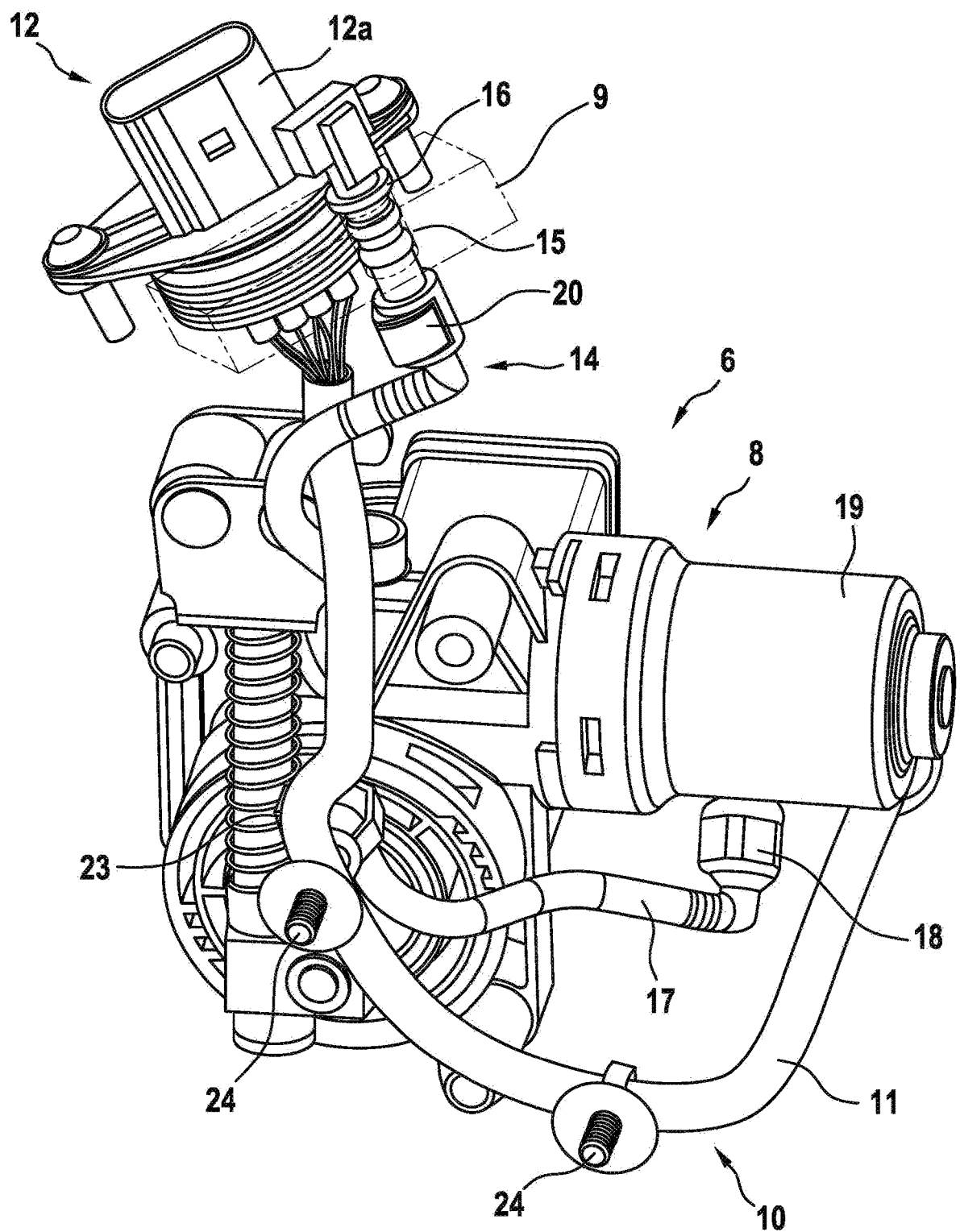
FIG. 2 shows a perspective view of the parking lock actuator and of the pressure equalization apparatus.

FIG. 2 is a perspective view of the parking lock actuator 8 and of the pressure equalization apparatus 14. Furthermore, the connection apparatus 10 and, shown in outlined dashed lines, the transmission housing 9 with the transmission through opening 15 for the pressure equalization apparatus 14 are illustrated.

The pressure equalization apparatus 14 comprises a lead-through element 16 which passes through the transmission housing opening 15, and a fluid guiding element 17, the first end of which is connected to the interior of the parking lock actuator 8 and the second end of which is connected to the lead-through element 16.

At the first end of the fluid guiding element 17, the pressure equalization apparatus 14 has a first coupling 18 which is connected in a latching manner to a diametrically opposed coupling—concealed in FIG. 2—which is formed on a parking lock actuator housing 19. At the second end of the fluid guiding element 17, the pressure equalization apparatus 14 has a second coupling 20 which is connected in a latching manner to a diametrically opposed coupling 21—concealed in FIG. 2—(see FIG. 3 and FIG. 4) of the lead-through element 16.

Figure 3:
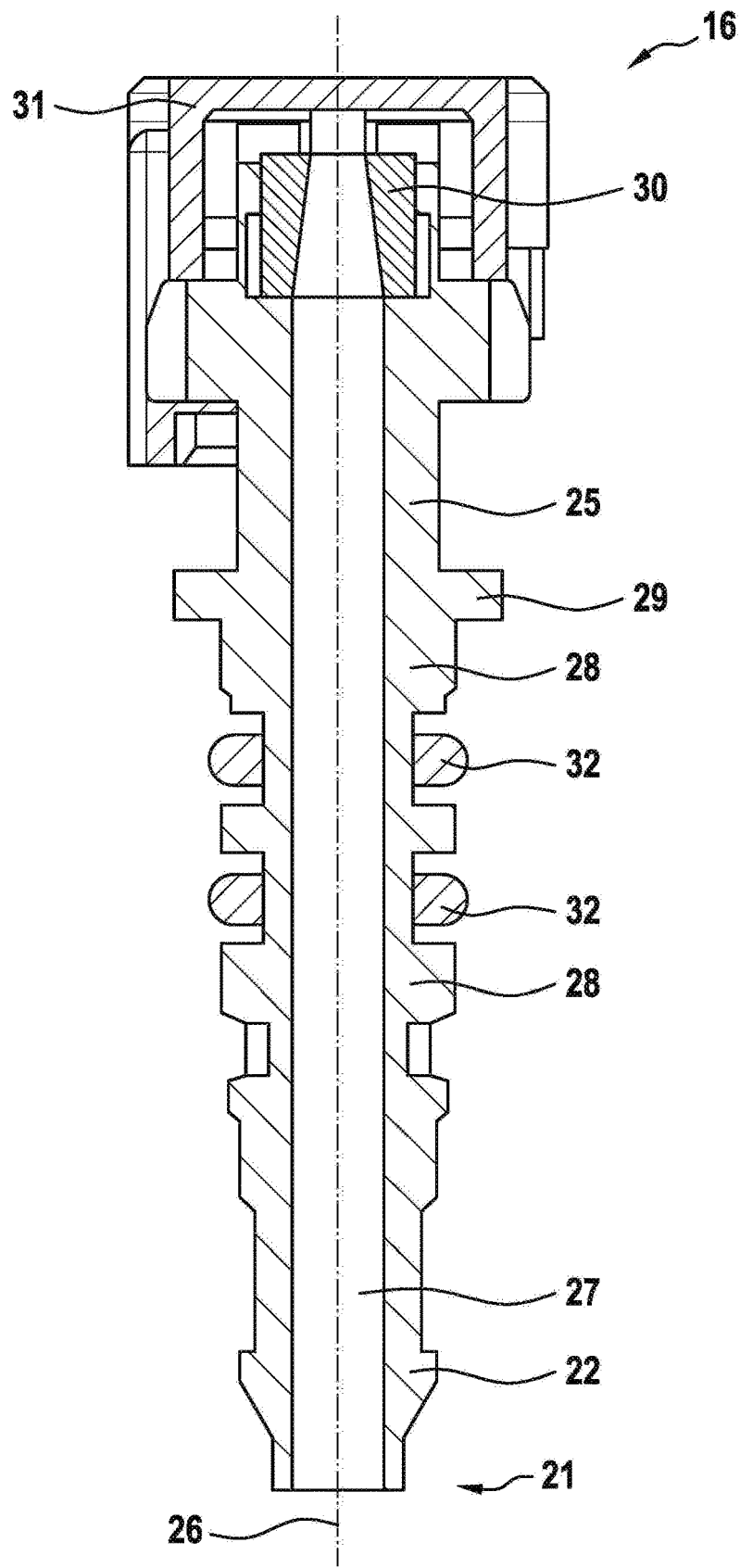
FIG. 3 shows a sectional view of the lead-through element through line A of FIG. 1.
Figure 4:
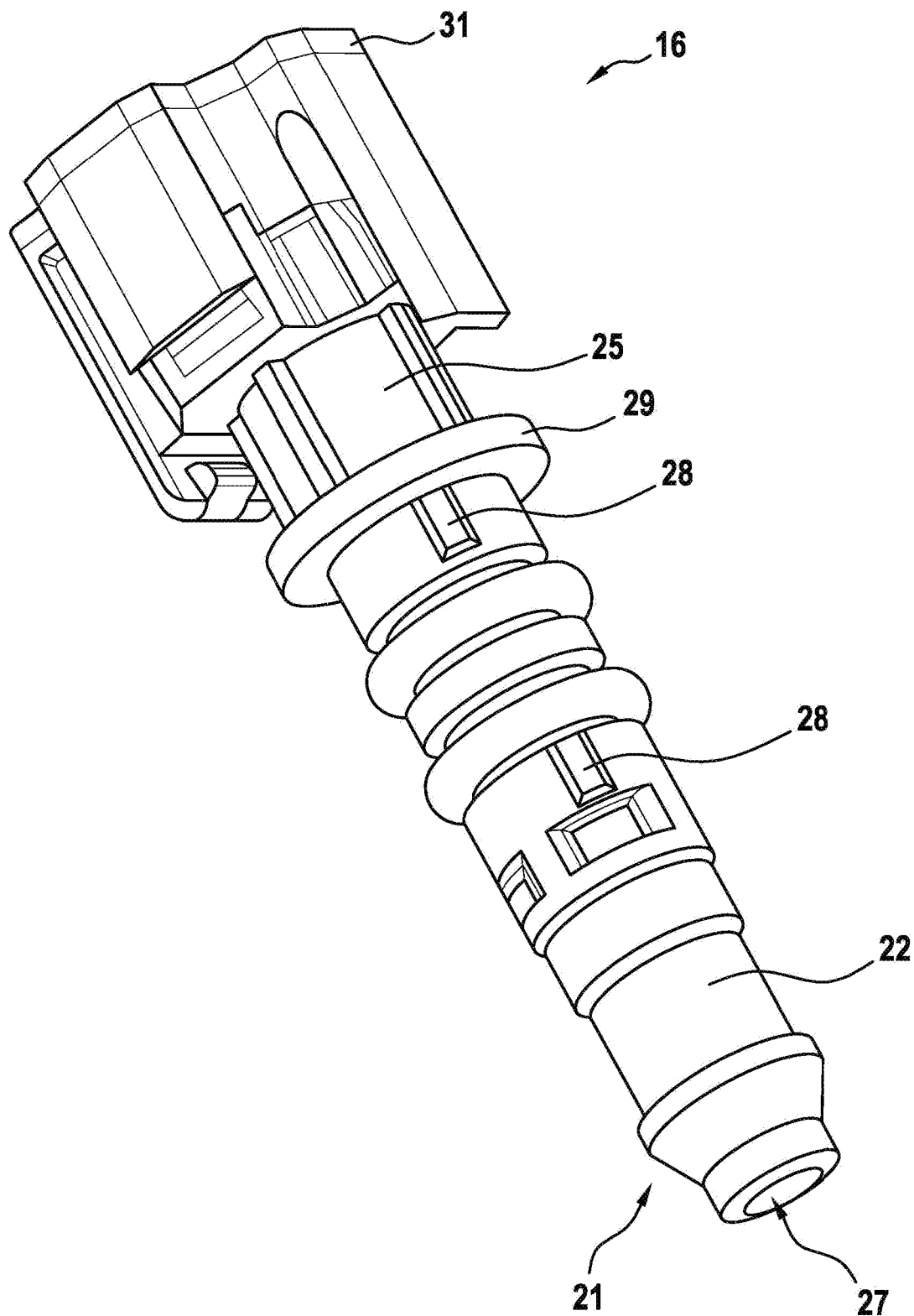
FIG. 4 shows a perspective view of the lead-through element.

The couplings 18, 20 of the pressure equalization apparatus 14, the coupling 21, and the coupling formed on the parking lock actuator housing 19 are each designed as a cup coupling for this purpose, wherein the coupling 21 and the coupling on the parking lock actuator housing 19 each have a latching collar 22 (see FIG. 3 and FIG. 4).

The fluid guiding element 17 is designed as a dimensionally stable tube that winds around the connection apparatus 10 and is fastened to the cable arrangement 11 by means of a fastening means 23 arranged on the fluid guiding element 17. Also visible are fastening means 24 of the connection apparatus 10 that are attached to the cable arrangement 11 and by means of which the connection apparatus 10 is fastened within the transmission housing 9.

FIG. 3 and FIG. 4 each show the lead-through element 16, wherein FIG. 3 is a sectional view and FIG. 4 is a perspective view.

The lead-through element 16 comprises an elongate body 25. A cylindrical clearance 27 which tapers toward an outer end of the body 25 extends along a longitudinal axis 26 of the body 25. On the outside of the body 25 there is a latching collar 22 which is provided to form the cup coupling 21. A plurality of radially outwardly pointing projections 28 of the body are provided for fastening the lead-through element 16 in the transmission housing opening 15 by means of a press fit. A likewise radially outwardly pointing collar 29 of the body 25 rests on the transmission housing 9 from the outside and forms a stop for the insertion of the lead-through element 16.

In addition, the lead-through element 16 has a membrane 30 outside the transmission housing 9 and a gas-permeable protective cap 31 at its free end or at the free end of the body 25. Furthermore, a sealing means 31 is provided, which comprises two sealing rings 32 arranged on the body 25 coaxially with respect to the longitudinal axis 26.

According to a further exemplary embodiment, the lead-through element 16 is screwed into the housing opening 15. According to a further exemplary embodiment, the lead-through element 16 and the first plug connector 12 and the same through opening are passed through. For this purpose, a flange portion 12a (see FIG. 2) of the first plug connector can be expanded accordingly and passed through by the lead-through element 16.

Figure 5:
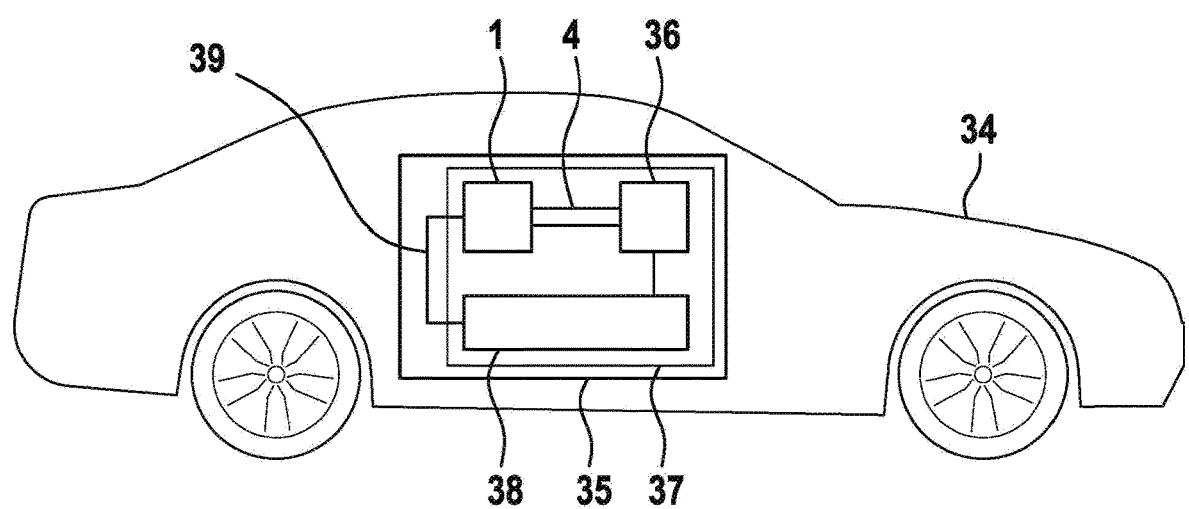
FIG. 5 shows a schematic diagram of an exemplary embodiment of the vehicle according to the invention with an exemplary embodiment of the drive device according to the invention.

FIG. 5 is a schematic diagram of an exemplary embodiment of a vehicle 34 with an exemplary embodiment of a drive device 35.

The drive device 35, which is configured for driving the vehicle 34, comprises an electric machine 36, the transmission device 1, and the shaft 4, which is configured for transmitting a rotational motion of the electric machine to the transmission device 1.

The transmission housing 9 is part of a housing 37 enclosing the electric machine 36, the shaft 4, and the transmission device.

In addition, the drive device 35 has an inverter 38 that is configured to convert a DC voltage into an AC voltage that supplies the electric machine 36. The inverter 38 is connected to the first plug connector 12 of the connection apparatus 10 (see FIG. 1) by means of a cable 39 in order to supply and activate the parking lock 8 electrically.

The invention claimed is:

1. A transmission device for an electrically driveable vehicle, comprising:
   a transmission element;
   a parking lock by which the transmission element is blocked and which has a parking lock actuator;
   a transmission housing that encloses the transmission element and the parking lock; and
   a pressure equalization apparatus by which an interior of the parking lock actuator is connected to an exterior of the transmission housing in a gas-permeable manner,
   wherein the pressure equalization apparatus comprises a lead-through element which passes through a transmission housing opening, and a fluid guiding element, the first end of which is connected to the interior of the parking lock actuator and the second end of which is connected to the lead-through element.

2. The transmission device as claimed in claim 1, wherein the pressure equalization apparatus at the first end of the fluid guiding element has a first coupling which is connected in a latching manner to a diametrically opposed second coupling of the parking lock actuator, and wherein the second end of the fluid guiding element has a third coupling which is connected in a latching manner to a diametrically opposed fourth coupling of the lead-through element.

3. The transmission device as claimed in claim 2, wherein the first coupling at the first end of the fluid guiding element is configured as a cup coupling and/or the third coupling at the second end of the fluid guiding element is configured as a cup coupling.

4. The transmission device as claimed in claim 2, wherein the second coupling of the parking lock actuator and/or the fourth coupling of the lead-through element has or have a latching collar.

5. The transmission device as claimed in claim 1, wherein the lead-through element has a membrane outside the transmission housing.

6. The transmission device as claimed in claim 1, wherein the lead-through element has a gas-permeable protective cap at its free end outside the transmission housing.

7. The transmission device as claimed in claim 1, wherein the lead-through element has at least one sealing means which seals the lead-through element in relation to the transmission housing opening.

8. The transmission device as claimed in claim 7, wherein the sealing means comprises one or more sealing rings.

9. The transmission device as claimed in claim 1, wherein the lead-through element is fastened by means of a press fit in the transmission housing opening or is passed through the transmission housing opening with a plug connector.

10. A drive device for an electrically driveable vehicle, comprising:
    an electric machine;
    a transmission device as claimed in claim 1; and
    a shaft transmitting a rotational motion of the electric machine to the transmission device.

11. The drive device as claimed in claim 10, wherein the transmission housing is part of a housing enclosing the electric machine, the transmission device, and the shaft.

12. A vehicle, comprising: a drive device as claimed in claim 10, which is configured for driving the vehicle.

\* \* \* \* \*